United States Patent
Schmid et al.

(10) Patent No.: US 6,672,061 B2
(45) Date of Patent: Jan. 6, 2004

(54) INTERNAL COMBUSTION ENGINE WITH AN EXHAUST TURBOCHARGER AND AN EXHAUST-GAS RECIRCULATION DEVICE

(75) Inventors: Wolfram Schmid, Nuertingen (DE); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/278,996

(22) Filed: Oct. 24, 2002

(65) Prior Publication Data

US 2003/0154717 A1 Aug. 21, 2003

(30) Foreign Application Priority Data

Oct. 25, 2001 (DE) .......................... 101 52 804

(51) Int. Cl.[7] .......................... F02B 33/44; F02M 25/07
(52) U.S. Cl. .................... 60/605.2; 60/602; 123/568.17
(58) Field of Search ................ 60/605.2, 602; 415/157, 158; 123/568.17; 29/889.2; F02M 25/07; F02D 23/00; F02B 33/44

(56) References Cited

U.S. PATENT DOCUMENTS

| 4,179,892 A | * | 12/1979 | Heydrich | ................ 60/605.2 |
|---|---|---|---|---|
| 4,544,326 A | * | 10/1985 | Nishiguchi et al. | .......... 60/602 |
| 5,092,126 A | * | 3/1992 | Yano | ........................ 60/602 |
| 5,943,864 A | * | 8/1999 | Sumser et al. | ............ 60/605.2 |
| 6,216,459 B1 | | 4/2001 | Daudel et al. | ............ 60/605.2 |

FOREIGN PATENT DOCUMENTS

| DE | 4209469 C1 | * | 4/1993 | .......... F02M/25/07 |
|---|---|---|---|---|
| DE | 198 57 234 A1 | | 6/2000 | ................ 60/605.2 |
| DE | 10132672 A1 | * | 1/2003 | .......... F02M/25/07 |
| FR | 2831611 A1 | * | 5/2003 | .......... F02M/25/07 |
| JP | 58018522 A | * | 2/1983 | .......... F02B/37/12 |

* cited by examiner

Primary Examiner—Thomas Denion
Assistant Examiner—Thai-Ba Trieu
(74) Attorney, Agent, or Firm—Crowell & Moring LLP

(57) ABSTRACT

An internal combustion engine with an exhaust turbocharger and an exhaust-gas recirculation device comprises a turbine, assigned to the exhaust turbocharger, in the exhaust section and a compressor in the intake duct, the turbine having at least two flow passages, via which exhaust gas can be fed to the turbine rotor. For the purpose of dimensioning the two flow passages, an asymmetry factor is determined as a function of the displacement of the internal combustion engine.

25 Claims, 3 Drawing Sheets

INTERNAL COMBUSTION ENGINE WITH AN EXHAUST TURBOCHARGER AND AN EXHAUST-GAS RECIRCULATION DEVICE

This application claims the priority of German Patent Document No. 101 52 804.3, filed Oct. 25, 2001, the disclosure of which is expressly incorporated by reference herein.

BACKGROUND AND SUMMARY OF THE INVENTION

The invention relates to an internal combustion engine with an exhaust turbocharger and an exhaust-gas recirculation device.

DE 198 57 234 A1 discloses a pressure-charged internal combustion engine, the exhaust turbocharger of which is equipped with variable turbine geometry for the variable setting of the inlet flow cross section to the turbine rotor. Adjusting the variable turbine geometry changes the effective inlet flow cross section, thereby adjusting the exhaust backpressure in the exhaust section between the cylinder outlet of the internal combustion engine and the inlet of the turbine in a specific way and allowing the power consumption of the turbine and, as a result, also the compressor power of the compressor to be adjusted. It is thereby possible to achieve increases in power both in the powered driving mode and in the engine-braking mode.

To improve the exhaust behaviour, in particular to reduce $NO_x$ emissions, the internal combustion engine is equipped with an exhaust-gas recirculation device, by means of which exhaust gas can be recirculated from the exhaust system into the intake duct. The level of the mass flow of exhaust gas to be recirculated is set as a function of current state variables and operating parameters.

The exhaust turbine has two spiral flow passages, which are separated by a dividing wall. Each flow passage is supplied with exhaust gas via a gas line assigned to it. It is possible for the exhaust gas of a respective fraction of the cylinder outlets of the internal combustion engine to be discharged via each exhaust line. The two flow passages have flow cross sections of different sizes, the recirculation line of the exhaust-gas recirculation device branching off from the smaller flow passage, in which a higher exhaust backpressure prevails owing to the smaller cross section, promoting exhaust-gas recirculation.

The dimensioning of the exhaust turbocharger depends on the size of the internal combustion engine used and is generally determined from empirical values. However, determining the size ratio of the two flow passages in the exhaust turbocharger to one another is problematic. However, optimum dimensioning is a prerequisite for clean exhaust behaviour of the internal combustion engine.

Starting from this prior art, a problem underlying the invention is to optimize an internal combustion engine in such a way that pollutant emissions and fuel consumption are reduced. In particular, the intention is to specify a relationship for dimensioning the two flow passages of the exhaust turbocharger relative to one another.

To establish the size ratio of the two flow passages, an asymmetry factor $F_{Asym}$ is defined from the ratio of the turbine throughput parameters $\phi_{f11,S}$ and $\phi_{f12,S}$, which are to be determined in the region of the choke line of the exhaust turbine from the mass flow of exhaust gas, the exhaust-gas temperature and the exhaust-gas pressure. According to the invention, the maximum value of this ratio of the turbine throughput parameters of the two flow passages, may be no greater than the reciprocal of the total displacement of the internal combustion engine, raised to the power 0.15.

This specifies a relationship between a defining variable characterizing the geometry of the flow passages and the displacement of the internal combustion engine, making it possible to determine the size ratio of the flow passages as a function of the displacement. Using an empirical or, if appropriate, an analytical relationship, it is possible to deduce geometric characteristic values of the respective flow passage from the ratio of the turbine throughput parameters. In particular, it is possible, from this relationship, to establish the spiral cross section of the spiral flow passage in the inlet flow and the radial distance between the central axis in the inlet flow of the spiral cross section and the axis of rotation of the turbine rotor. In principle, these geometric variables are sufficient for the design configuration of each flow passage. With a knowledge of the total displacement of the internal combustion engine, it is thus possible to deduce the actual dimensioning of each flow passage in the exhaust turbocharger.

In an expedient development, the recirculation line of the exhaust-gas recirculation device is connected to the smaller of the flow passages. Because of its smaller cross section, the smaller flow passage has higher pressure, which can be used for the recirculation of exhaust gas from the exhaust section to the intake duct. The higher pressure in the smaller flow passage allows recirculation of exhaust gas even at low engine speeds and, as a result, improves emissions and consumption behaviour. It may be advantageous to separate the two flow passages in a pressure-tight manner from one another within the turbocharger casing in order to prevent an undesirable pressure compensation between the flow passages and to enable the pressure drop between the passages to be used in an optimum manner for exhaust-gas recirculation.

It is also advantageous to connect each flow passage to a separate exhaust line for a fraction of the cylinder outlets of the internal combustion engine, with the result that each exhaust line receives only the exhaust gas of a fraction of the cylinders of the engine. In a simple embodiment, the cylinders are divided symmetrically between the two exhaust lines. However, it may also be expedient to connect the two exhaust lines to different numbers of cylinders of the internal combustion engine. The exhaust line which carries away the exhaust gas from the larger number of cylinders is connected, in particular, to the larger flow passage.

In a preferred development, the exhaust turbine has variable turbine geometry, by means of which the inlet flow cross section between at least one flow passage and the turbine rotor can be set in a variable manner. The variable turbine geometry in the flow passage that is not involved in exhaust-gas recirculation can be opened during the powered driving mode of the internal combustion engine, in particular, in order to reduce flow resistance. As a result, the exhaust backpressure in this flow passage is reduced too, and less compression work has to be performed by the cylinders assigned to this flow passage. In the case of exhaust lines that are made separately for the two flow passages, the recirculated mass flow of exhaust gas can be adjusted independently of the position of the variable turbine geometry via the adjustment of a recirculation valve.

If appropriate, the variable turbine geometry also extends to the inlet flow cross section of the smaller flow passage, or this inlet flow cross section may be equipped with its own variable turbine geometry, which can be adjusted independently of the turbine geometry of the larger flow passage.

The relationship according to the invention for determining the size ratio of the flow passages can also be used with more than two flow passages. Thus, it is possible, in the case of a total of three flow passages, to add the turbine throughput parameters of the two smaller flow passages. The sum of the turbine throughput parameters of these flow passages can be used as a combined value to determine the asymmetry factor, formed from the ratio of the common value for the two smaller flow passages to the value for the larger flow passage. In this embodiment, both smaller flow passages are expediently connected to the exhaust-gas recirculation device and are supplied by a common exhaust line.

In the case where a variable turbine geometry is used, the turbine throughput parameter for the flow passage equipped with variable turbine geometry is determined in the region of the choke line of the exhaust turbine in the position of maximum opening of the turbine geometry.

It may be advantageous to provide a blow-off device as well, which is designed as a bypass to the exhaust turbine and via which an adjustable mass flow of exhaust gas can be guided around the turbine to avoid a critical excess pressure. The blow-off device can likewise be assigned a turbine throughput parameter, which is added to the sum of the throughput parameters for each flow passage in order to establish the absolute size of the exhaust turbocharger to be used. However, the throughput parameter for the blow-off is preferably not included in the determination of the asymmetry factor, i.e. in the determination of the ratio of the throughput parameters through the flow passages. The blow-off device is, in particular, assigned to the smaller flow passage.

Other objects, advantages and novel features of the present invention will become apparent from the following detailed description of the invention when considered in conjunction with the accompanying drawings.

DETAILED DESCRIPTION OF THE DRAWINGS

Figure 1:
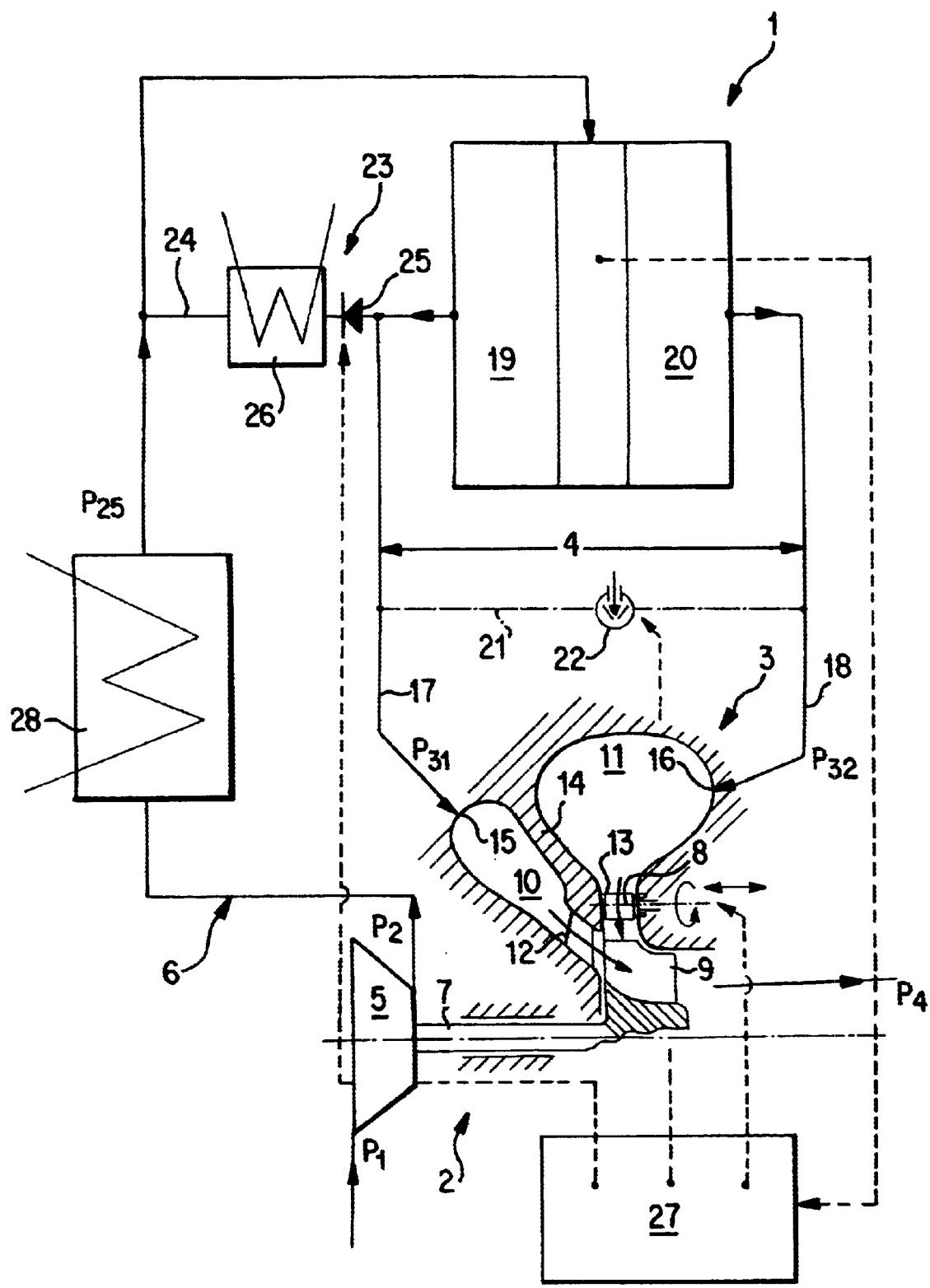
FIG. 1 shows a schematic representation of a pressure-charged internal combustion engine with a double-passage combination turbine with a semi-axial and a radial inlet flow cross section.

In the following figures, identical components are provided with identical reference numerals.

The internal combustion engine in FIG. 1 is a spark-ignition engine or a diesel engine. The internal combustion engine 1 is assigned an exhaust turbocharger 2 with a turbine 3 in the exhaust section 4 of the internal combustion engine and a compressor 5 in the suction duct 6. The motion of the turbine rotor is transmitted to the compressor impeller of the compressor 5 via a shaft 7, whereupon fresh air drawn in at atmospheric pressure pi is compressed by the compressor 5 to an increased pressure $P_2$. The exhaust turbine 3 of the exhaust turbocharger is provided with variable turbine geometry 8, with which the effective inlet flow cross section to the turbine rotor 9 can be adjusted. The variable turbine geometry 8 is designed, in particular, as a guide vane system that is arranged in the inlet flow cross section of the turbine and has adjustable guide vanes.

The turbine 3 is designed as a double-passage combination turbine with a first flow passage 10 and a second flow passage 11. The first flow passage 10 has a semi-axial inlet flow cross section 12 leading to the turbine rotor 9, and the second flow passage 11 has a radial inlet flow cross section 13 leading to the turbine rotor 9. Both flow passages 10 and 11 are designed as spiral passages, via which exhaust gas from the internal combustion engine can be fed to the turbine rotor 9. The two flow passages 10 and 11 are separated by a dividing wall 14, in particular separated in a pressure-tight manner.

Exhaust gas from the internal combustion engine is to be fed to the flow passages 10 and 11 via separate exhaust lines 17 and 18, which open into the flow passages at inflow connections 15 and 16. The internal combustion engine has two separate banks 19 and 20 of cylinders. The banks of cylinders are assigned the exhaust lines 17 and 18, respectively, via which the exhaust gas from the relevant bank of cylinders can be fed to the flow passages 10 and 11 respectively.

As regards its flow cross section and its volume, the first flow passage 10 is smaller than the second flow passage 11. The exhaust line 17 assigned to the first, smaller flow passage 10 is connected to an exhaust-gas recirculation device 23, via which exhaust gas can be transferred from the exhaust section to the intake duct of the internal combustion engine. The exhaust-gas recirculation device 23 comprises a recirculation line 24, which branches off from the exhaust line 17 assigned to the smaller flow passage 10 and opens into the intake duct 6 downstream of an intercooler 28. Arranged in the recirculation line 24 is an adjustable shut-off valve 25, for the purpose of adjusting the mass flow of exhaust gas to be recirculated, and an exhaust cooler 26.

The two exhaust lines 17 and 18 can be connected to one another by a bypass line 21, in which there is an adjustable bypass valve 22.

Finally, a control and regulating device 27 is provided, to which state and operating variables of the internal combustion engine can be fed via signal lines and which produces actuating signals for the purpose of adjusting the variable turbine geometry, the bypass valve 22 and the shut-off valve 25 in the exhaust-gas recirculation device.

The combustion air compressed to the increased pressure $p_2$ in the compressor 5 is cooled in the intercooler 28 and enters the air inlet of the internal combustion engine at the boost pressure $p_{2S}$. The exhaust gases from the first bank 19 of cylinders are fed at the exhaust backpressure $p_{31}$ to the first, smaller flow passage 10 via the first exhaust line 17. The exhaust gases from the second bank 20 of cylinders are fed at the exhaust backpressure $p_{32}$ to the second, larger flow passage 11 via the second exhaust line 18. The exhaust backpressures $p_{31}$ and $p_{32}$ may differ significantly, depending on the operating status of the internal combustion engine and the current position of the adjustable devices—in particular of the variable turbine geometry 8 and of the bypass valve 22 and the shut-off valve 25—and, in particular, the exhaust backpressure $p_{31}$ may be higher than the exhaust backpressure $p_{32}$ owing to the smaller cross section of the flow passage 10, thereby promoting exhaust-gas recirculation from the first exhaust line 17 to the intake duct 6.

After flowing through the exhaust turbine 3, the exhaust gas is discharged from the exhaust section 4 at the expanded pressure $p_4$ after catalytic cleaning.

Figure 2:
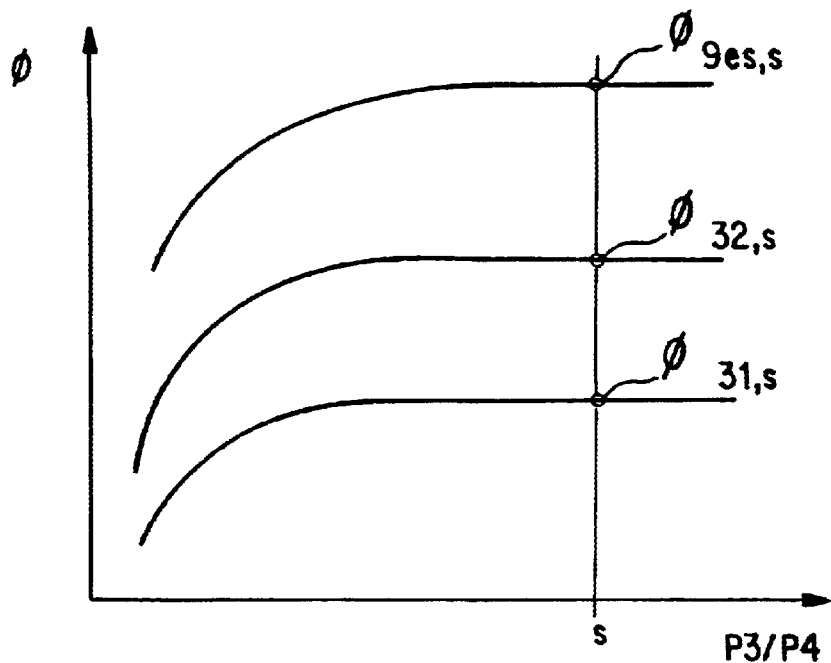
FIG. 2 shows a diagram with curves for turbine throughput parameters as a function of the pressure ratio across the exhaust turbine.

FIG. 2 shows various characteristics of the turbine throughput parameter φ as a function of the pressure drop $p_3$ to $p_4$ across the turbine. The turbine throughput parameter φ is calculated in general terms in accordance with the relation $$\phi = m\sqrt{T}/p$$

as a function of the mass flow m of exhaust gas through the turbine, the temperature T of the exhaust gas and the exhaust backpressure p. FIG. 2 shows asymptotic curves for the turbine throughput parameter $\phi_{31,S}$, which corresponds to the turbine throughput through the smaller flow passage in the region of the choke line S of the turbine, at which a supercritical turbine pressure prevails (generally characterized by a turbine pressure ratio $p_3$ to $p_4$ greater than 3), and curves for the turbine throughput parameter $\phi_{32,S}$, which is associated with the larger flow passage, and a curve for a total turbine throughput $\phi_{ges,S}$, which is calculated in accordance with the relation $$\phi_{ges,S} = \phi_{31,S} + \phi_{32,S}$$

of the sum of the individual values of the turbine throughput parameters $\phi_{31,S}$ and $\phi_{32,S}$ in both flow passages. The total turbine throughput parameter $\phi_{ges,S}$ can be determined empirically or analytically from the size of the internal combustion engine, in particular the total displacement.

To distribute the size ratio between the smaller flow passage and the larger flow passage, an asymmetry factor $F_{Asym}$ can be determined in accordance with the relation $$F_{Asym} = \phi_{31,S}/\phi_{32,S} \leq (1/V_H)^{0.15}$$

Figure 3:
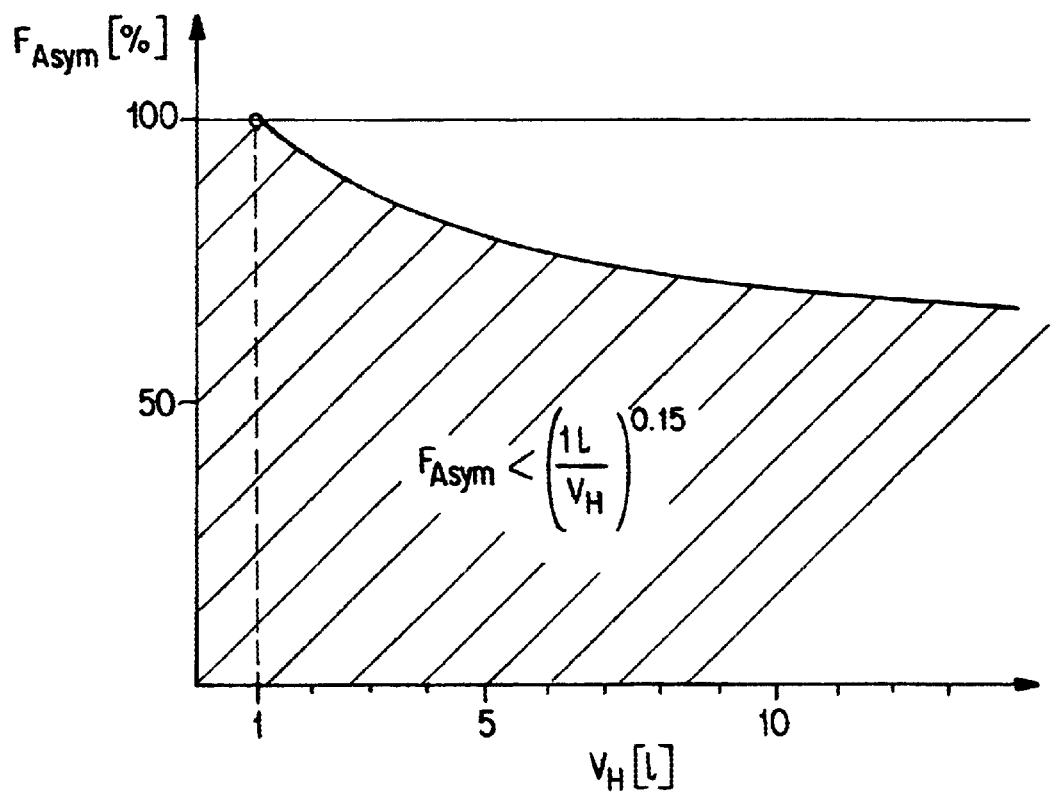
FIG. 3 shows a diagram indicating the variation in the asymmetry factor for establishing the throughput parameters through the flow passages as a function of the total displacement of the internal combustion engine.

This relation indicates the relationship between the ratio of the turbine throughput parameters $\phi_{31,S}$, $\phi_{32,S}$ through the smaller flow passage and through the larger flow passage of the exhaust turbine and the total displacement of the internal combustion engine ($V_H$), measured in litres. Thus, for example, a total displacement of the internal combustion engine of one litre still leads to a symmetrical geometry distribution between the flow passages since an asymmetry factor $F_{Asym}=1$ is obtained at a displacement of one litre, as can be seen from FIG. 3, in which the permissible range for the asymmetry factor $F_{Asym}$ is shown in the shaded area. As the displacement of the internal combustion engine increases, the asymmetry factor falls, signifying that the flow rate parameter $\phi_{31,S}$ for the smaller flow passage in the region of the choke line falls below the value of the turbine throughput parameter $\phi_{32,S}$ for the larger flow passage in the region of the choke line. Knowing the asymmetry factor $F_{Asym}$ and the association with the relationship (described in FIG. 2) between the total throughput parameter and the individual values for the two flow passages, as well as the empirical or analytical relationship between the turbine throughput parameter and the geometry variable for each flow passage, it is possible to accurately determine and dimension each flow passage as a function of the total displacement of the internal combustion engine.

In summary, to design a double-passage exhaust turbine with one of its flow passages communicating with an exhaust-gas recirculation device, the total throughput parameter through the turbine is established as a function of the size of the internal combustion engine, an asymmetry factor in accordance with the relation describing the ratio of the individual throughput parameters is determined, and the dimension of each flow passage 10 and 11 is established in conjunction with the sum of the individual throughput parameters for each flow passage to give the total throughput parameter.

Figure 4:
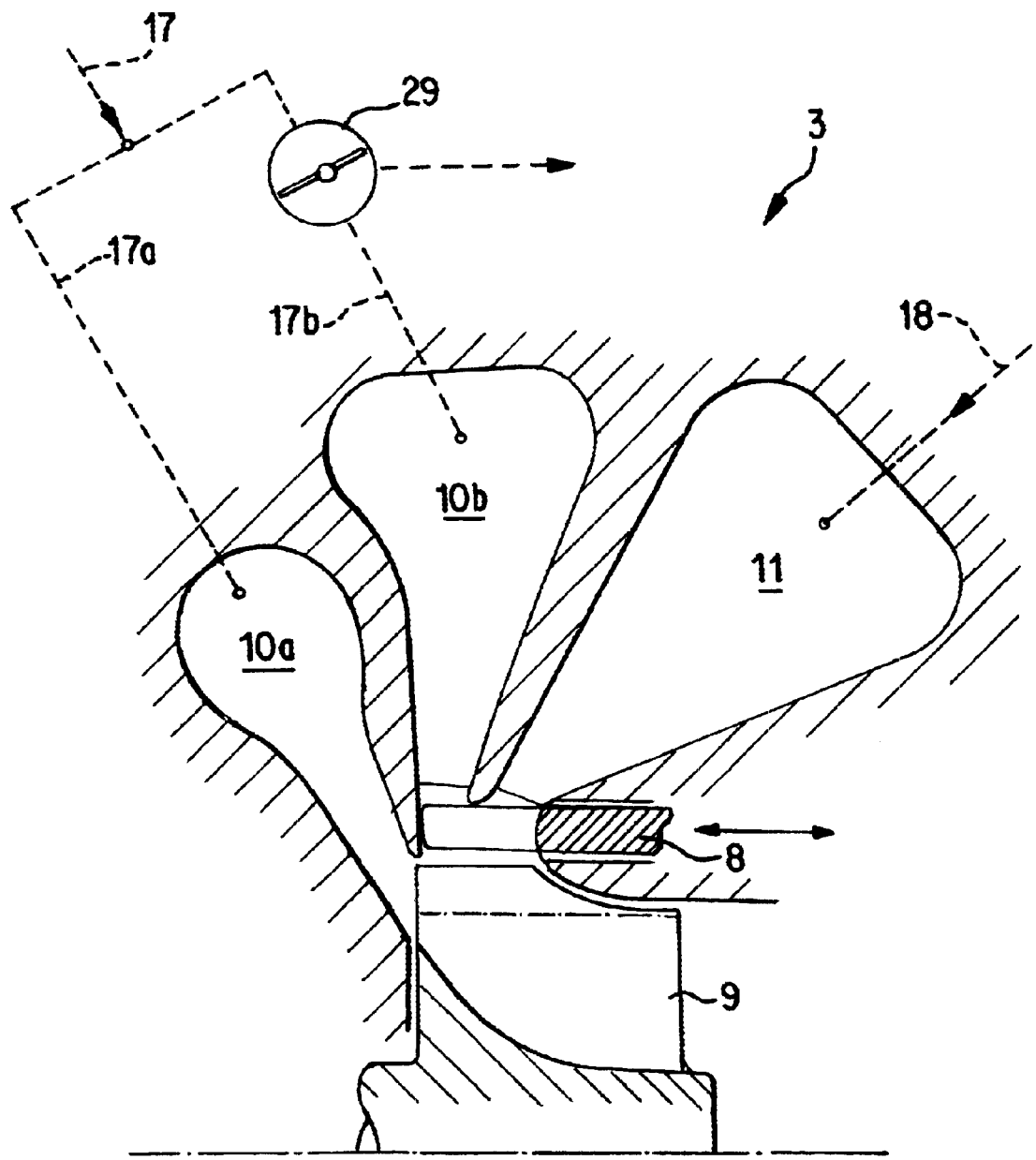
FIG. 4 shows a section through a three-passage exhaust turbine.

FIG. 4 shows a modified exhaust turbine 3 with a total of three flow passages 10a, 10b and 11. The exhaust turbine 3 is equipped with variable turbine geometry 8, which is embodied as an axially displaceable guide vane system and can be pushed into the inlet flow cross section between the flow passages 10b and 11 and the turbine rotor 9. The three flow passages 10a, 10b and 11 each have a different cross section, and the sum of the two smaller flow passages 10a and 10b advantageously is no larger than the larger flow passage 11. The two smaller flow passages 10a and 10b are supplied jointly via the exhaust line 17 with the exhaust gas of one bank of cylinders of the internal combustion engine, which has two banks of cylinders, whereas the larger flow passage 11 is supplied with the exhaust gas from the second bank of cylinders by a separate exhaust line 18. The first exhaust line 17 is divided into two line sections 17a and 17b, which are connected directly to the smaller flow passages 10a and 10b, respectively. In the line section 17b associated with the larger of the two smaller flow passages 10a, 10b there is a throttle 29, which can be adjusted in such a way that the line section 17b is either open or closed or that the exhaust gas from this line section is diverted or blown off, bypassing the turbine. This gives a further setting for the exhaust-gas recirculation device connected to the exhaust line 17.

For the purpose of dimensioning the flow passages 10a, 10b and 11, it is once again possible to use the above-mentioned relation for the asymmetry factor $F_{Asym}$, the two smaller flow passages 10a and 10b communicating with the exhaust-gas recirculation device forming the value for the turbine throughput parameter in accordance with the relation $$\phi_{31,S} = \phi_{kl1}$$

or $$\phi_{31,S} = \phi_{kl2}$$

The asymmetry factor $F_{Asym}$ is defined as the ratio of the turbine throughput parameter $\phi_{31,S}$—individual throughput parameter for the smaller flow passages 10a and 10b—to the turbine throughput parameter $\phi_{32,S}$, which is associated with the larger flow passage 11, which is supplied via the second, separate exhaust line 18. The asymmetry factor $F_{Asym}$ must again satisfy the relation $$F_{Asym} \leq (1/V_H)^{0.15}.$$

The total turbine throughput $\phi_{ges,S}$ $$\phi_{ges,S} = \phi_{31,S} + \phi_{32,S}$$

as the sum of the individual values of the turbine throughput parameters $\phi_{31,S}$ and $\phi_{32,S}$ in all the flow passages is determined empirically or analytically from the size of the internal combustion engine, in particular the total displacement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An internal combustion engine comprising:
   an exhaust turbocharger including,
   an exhaust turbine disposed in an exhaust section, the exhaust turbine having a choke line, a turbine rotor and two flow passages for feeding exhaust gas to the turbine rotor, a compressor in an intake duct, and an exhaust-gas recirculation device having a recirculation line disposed between one of the flow passages and the intake duct; and wherein an asymmetry factor ($F_{Asym}$) defining the size ratio of the flow passages of the exhaust turbine satisfies the formula $$F_{Asym} \leq (1/V_H)^{0.15}$$

wherein $V_H$ is the total displacement of the internal combustion engine, and wherein the asymmetry factor ($F_{Asym}$) is defined as $$F_{Asym} = \phi_{31,S}/\phi_{32,S}$$

wherein $\phi_{31,S}$ and $\phi_{32,S}$ denote turbine throughput parameters in a region of the choke line of the exhaust turbine and are determined from the formula $$\phi_{31,S} = m_{31,S}\sqrt{T_{31,S}}/p_{31,S}$$

$$\phi_{32,S} = m_{32,S}\sqrt{T_{32,S}}/p_{32,S}$$

wherein $m_{31,S}$, $m_{32,S}$ denote the mass flows of exhaust gas through the first and second flow passages, respectively, in the region of the choke line of the exhaust turbine, wherein $T_{31,S}$, $T_{32,S}$ denote the exhaust-gas temperatures in the first and second flow passages, respectively, in the region of the choke line of the exhaust turbine, and wherein $p_{31,S}$, $p_{32,S}$ denote the exhaust-gas pressures in the first and second flow passages, respectively, in the region of the choke line of the exhaust turbine.

2. The internal combustion engine according to claim 1, wherein the recirculation line is connected to the smaller of the flow passages.

3. The internal combustion engine according to claim 2, wherein the exhaust turbine includes a variable turbine geometry, by which an inlet flow cross section between one of the flow passages and the turbine rotor is adjusted.

4. The internal combustion engine according to claim 3, wherein the variable turbine geometry is disposed in the inlet flow cross section of the larger of the flow passages.

5. The internal combustion engine according to claim 4, comprising three flow passages with each of the two smaller passages, wherein the turbine throughput parameter ($\phi_{31,S}$) is determined in accordance with $$\phi_{31,S} = \phi_{kl1}$$

or $$\phi_{31,S} = \phi_{kl2}$$

wherein $\phi_{kl1}$ and $\phi_{kl2}$ are the turbine throughput parameters of the two smaller passages.

6. The internal combustion engine according to claim 5, wherein the two smaller flow passages communicate with the exhaust-gas recirculation device.

7. The internal combustion engine according to claim 6, further comprising an adjustable throttling device disposed in the flow path between at least one of the two smaller flow passages and the exhaust-gas recirculation device.

8. The internal combustion engine according to claim 7, wherein the exhaust turbine has a blow-off device that bypasses the turbine rotor.

9. The internal combustion engine according to claim 8, wherein the blow-off device branches off from the smaller flow passage.

10. The internal combustion engine according to claim 1, further comprising two exhaust lines, wherein each exhaust line connects a bank of cylinders to each flow passage.

11. The internal combustion engine according to claim 1, wherein the exhaust turbine includes a variable turbine geometry, by which an inlet flow cross section between one of the flow passages and the turbine rotor is adjusted.

12. The internal combustion engine according to claim 11, wherein the variable turbine geometry is disposed in the inlet flow cross section of the larger of the flow passages.

13. The internal combustion engine according to claim 1, comprising three flow passages with each of the two smaller passages, wherein the turbine throughput parameter ($\phi_{31,S}$) is determined in accordance with $$\phi_{31,S} = \phi_{kl1}$$

or $$\phi_{31,S} = \phi_{kl2}$$

wherein $\phi_{kl1}$ and $\phi_{kl2}$ are the turbine throughput parameters of the two smaller passages.

14. The internal combustion engine according to claim 13, wherein the two smaller flow passages communicate with the exhaust-gas recirculation device.

15. The internal combustion engine according to claim 14, further comprising an adjustable throttling device disposed in the flow path between at least one of the two smaller flow passages and the exhaust-gas recirculation device.

16. The internal combustion engine according to one of claim 1, wherein the exhaust turbine has a blow-off device that bypasses the turbine rotor.

17. The internal combustion engine according to claim 8, wherein the blow-off device branches off from the smaller flow passage.

18. The internal combustion engine according to claim 1, wherein $\phi_{31,S}$ and $\phi_{32,S}$ denote turbine throughput parameters of the smaller and larger of the flow passages, respectively.

19. A method of making an internal combustion engine that includes an exhaust turbocharger including an exhaust turbine disposed in an exhaust section, and a compressor disposed in an intake duct, wherein the exhaust turbine includes a choke line, a turbine rotor and two flow passages for feeding exhaust gas to the turbine rotor, wherein the engine further includes an exhaust-gas recirculation device having a recirculation line disposed between one of the flow passages and the intake duct, the method comprising:

determining an asymmetry factor ($F_{Asym}$), which defines the size ratio of the flow passages of the exhaust turbine, in accordance with the formula, $$F_{Asym} \leq (1/V_H)^{0.15}$$

wherein $V_H$ is the total displacement of the internal combustion engine, and wherein the asymmetry factor ($F_{Asym}$) is defined as $$F_{Asym} = \phi_{31,S}/\phi_{32,S}$$

wherein $\phi_{31,S}$ and $\phi_{32,S}$ denote turbine throughput parameters in a region of the choke line of the exhaust turbine and are determined from the formula $$\phi_{31,S} = m_{31,S}\sqrt{T_{31,S}}/p_{31,S}$$

$$\phi_{32,S}=m_{32,S}\sqrt{T_{32,S}}/p_{32,S}$$

wherein $m_{31,S}$, $m_{32,S}$ denote the mass flows of exhaust gas through the first and second flow passages, respectively, in the region of the choke line of the exhaust turbine, wherein $T_{31,S}$, $T_{32,S}$ denote the exhaust-gas temperatures in the first and second flow passages, respectively, in the region of the choke line of the exhaust turbine, and wherein $p_{31,S}$, $p_{32,S}$ denote the exhaust-gas pressures in the first and second flow passages, respectively, in the region of the choke line of the exhaust turbine.

20. The method according to claim 19, further comprising connecting the recirculation line to the smaller of the flow passages.

21. The method according to claim 20, further comprising adjusting an inlet flow cross section between one of the flow passages and the turbine rotor using a variable turbine geometry of the exhaust turbine.

22. The method according to claim 21, further comprising disposing the variable turbine geometry in the inlet flow cross section of the larger of the flow passages.

23. The method according to claim 19, further comprising determining the turbine throughput parameter ($\phi_{31,S}$) in accordance with $$\phi_{31,S}=\phi_{kl1}$$

or $$\phi_{31,S}=\phi_{kl2}$$

wherein $\phi_{kl1}$ and $\phi_{kl2}$ are the turbine throughput parameters of the two smaller passages of the engine's three flow passages.

24. The method according to claim 23, further comprising connecting the two smaller flow passages with the exhaust-gas recirculation device.

25. The method according to claim 19, further comprising disposing an adjustable throttling device in the flow path between at least one of the two smaller flow passages and the exhaust-gas recirculation device.

* * * * *